United States Patent
El Baraka et al.

(10) Patent No.: US 8,952,685 B2
(45) Date of Patent: Feb. 10, 2015

(54) MAGNETIC DEVICE FOR DETERMINATION OF ANGULAR POSITION IN A MULTIPHASE ROTARY ELECTRICAL MACHINE

(75) Inventors: Khadija El Baraka, Bussy St Georges (FR); Jean-Marc Dubus, Combs la Ville (FR); Mamy Rakotovao, Vitry sur Seine (FR); Julien Mafaraud, Paris (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 657 days.

(21) Appl. No.: 13/123,427

(22) PCT Filed: Oct. 7, 2009

(86) PCT No.: PCT/FR2009/051913
§ 371 (c)(1),
(2), (4) Date: Oct. 25, 2011

(87) PCT Pub. No.: WO2010/040956
PCT Pub. Date: Apr. 15, 2010

(65) Prior Publication Data
US 2012/0032669 A1 Feb. 9, 2012

(30) Foreign Application Priority Data
Oct. 10, 2008 (FR) .................................... 08 56891

(51) Int. Cl.
*G01B 7/30* (2006.01)
*G01D 5/244* (2006.01)

(52) U.S. Cl.
CPC ...................................... *G01D 5/244* (2013.01)
USPC .................................................. 324/207.25

(58) Field of Classification Search
CPC ... G01D 5/145; G01D 5/2451; G01D 5/2497; G01D 5/2013; G01D 5/2455; G01D 5/2457; G01D 5/2452; G01D 5/2033; G01P 3/487; G01P 3/488; G01P 3/481; H02K 11/0021; F16C 41/007; G01B 7/30
USPC ........................................ 324/207.2, 207.25
See application file for complete search history.

(56) References Cited

U.S. PATENT DOCUMENTS 5,574,364 A * 11/1996 Kajimoto et al. ........ 324/207.12
5,898,301 A * 4/1999 La Croix et al. ......... 324/207.22
6,417,662 B1 * 7/2002 Wallrafen ..................... 324/174
6,593,734 B1 * 7/2003 Gandel et al. ............ 324/207.25

FOREIGN PATENT DOCUMENTS

| EP | 0 611 952 | 8/1994 |
| EP | 0 949 510 | 10/1999 |
| FR | 2 872 644 | 1/2006 |

OTHER PUBLICATIONS

Hutchinson, Translation of the claims for EP 0949510, obtained Nov. 16, 2013.*

* cited by examiner

*Primary Examiner* — Reena Aurora
(74) *Attorney, Agent, or Firm* — Berenato & White, LLC

(57) ABSTRACT

Disclosed is the selecting of the optimum characteristics of a magnetic device producing a sinusoidal signal for determination of angular position in a rotary machine. The device includes a multi-polar magnetic ring which is mobile in rotation around an axis, and creates a variable magnetic field according to an angle of rotation. In close proximity to the magnetic ring, a magnetic sensor is placed in this magnetic field, and generates the sinusoidal signal. The air gap between the sensor and ring is constituted by spacing the sensor by a distance E from the magnetic ring on a radial plane. Optimum performance is achieved when a first ratio e/E of a thickness e of the multi-polar magnetic ring in a direction which is radial relative to the air gap E is between 0.4 and 2.3. A second ratio h/e of a height h of the ring, in a direction which is axial relative to the thickness e, is between 1.5 and 8.

10 Claims, 10 Drawing Sheets

MAGNETIC DEVICE FOR DETERMINATION OF ANGULAR POSITION IN A MULTIPHASE ROTARY ELECTRICAL MACHINE

CROSS-REFERENCE TO RELATED APPLICATIONS AND CLAIM TO PRIORITY

This application relates to International Application No. PCT/FR2009/051913 filed Oct. 7, 2009 and French Patent Application No. 08/56891 filed Oct. 10, 2008, of which the disclosures are incorporated herein by reference and to which priority is claimed.

FIELD OF THE INVENTION

The present invention relates to a magnetic device for determination of angular position, which produces a signal comprising an alternative component which approximates a sine wave.

This device is designed in particular for the determination of an angular position of a rotor of a multiphase rotary electrical machine.

The invention thus also relates to a multiphase rotary electrical machine comprising a device of this type.

BACKGROUND OF THE INVENTION

The use of Hall-effect sensors or sensors with magneto-resistance in devices for determination of angular position is well known in the prior art, in particular for the purpose of controlling certain rotary electrical machines which are used in the automobile industry.

An example of these devices is given in international patent application WO2006/010864 by the company VALEO EQUIPEMENTS ELECTRIQUES MOTEUR.

The signals which are provided by the sensors, generally comprising a high level of harmonics, must sometimes be processed in order to obtain sinusoidal signals which permit better control of a multiphase electrical machine.

According to the teaching of the aforementioned application, certain particular linear combinations of unprocessed signals obtained from the sensors are free from harmonics, and close to the ideal sine wave form.

In U.S. Pat. No. 6,720,763, which also describes a resolver, a magnetic target, consisting of a multi-polar magnetic ring or disc, appears to create in the vicinity of the sensors a magnetic field which can produce as output sinusoidal signals without additional processing.

However, no precise information concerning the degree of purity of the sinusoidal signals obtained is disclosed.

In addition, it has been found experimentally by the applicant that this degree of purity, or the levels of harmonics of these signals were sensitive to the dispersions of assembly and mechanical tolerances of the different elements of the device, to the dispersions of the characteristics of the magnetic material of the target, and to the functioning temperature.

The aforementioned American patent also contains nothing about these points, which are crucial for the purpose of an industrial application.

A device is also known for angular determination, also known by the name of "resolver", which is placed at the end of the rotor shaft of an alternator starter, and provides signals which are representative of the angular position of this rotor.

SUMMARY OF THE INVENTION

The objective of the present invention is thus to eliminate the above-described disadvantages, by selecting the optimum characteristics of a magnetic device for determination of angular position, which produces a sinusoidal signal of the type comprising:

a multi-polar magnetic ring which is mobile in rotation around an axis, and creates a variable magnetic field according to an angle of rotation;

a magnetic sensor which is placed in this magnetic field, and generates this sinusoidal signal; and an air gap which is constituted by spacing the sensor by a distance E from the magnetic ring on a radial plane.

Remarkably, this objective is achieved when a first ratio e/E of a thickness e of the multi-polar magnetic ring in a direction which is radial relative to the air gap E is between 0.4 and 2.3.

According to the invention, a second ratio h/e of a height h of the ring, in a direction which is axial relative to the thickness e, is between 1.5 and 8.

Highly advantageously, according to the invention, this thickness e is between 1 mm and 5 mm, and preferably the air gap E is between 1 mm and 4 mm.

Benefit is also derived from the fact that an outer radius of the multi-polar magnetic ring is preferably between 40 mm and 80 mm.

This ring is advantageously constituted by elasto-ferrite. A level of surface magnetisation is preferably between 500 Gs and 800 Gs at 25° C.

The magnetic device for determination of angular position according to the invention produces a sinusoidal signal with a peak-to-peak value which is highly advantageously between 1V and 4V.

The invention also relates to a multi-phase rotary electrical machine comprising a stator and a rotor, which is distinguished in that it additionally comprises a magnetic device for determination of angular position which produces a sinusoidal signal, the sensor of which is integral with the stator, and the multi-polar magnetic ring of which is secured axially to the rotor, and has the above-described optimised characteristics.

These few essential characteristics will have made apparent to persons skilled in the art the advantages provided by the magnetic device for determination of angular position according to the invention, in comparison with the prior art, in terms of the reduction of the level of harmonics of the sinusoidal signal produced.

The detailed specifications of the invention are given in the following description, which is provided in association with the appended drawings. It should be noted that the purpose of these drawings is simply to illustrate the text of the description, and that they do not constitute in any way a limitation of the scope of the invention.

BRIEF DESCRIPTION OF THE DRAWINGS

FIG. 1b shows a partial radial cross-section of the multi-polar magnetic ring of the device in FIG. 1a.

FIG. 4b illustrates schematically two multi-polar magnetic rings with two different radial thicknesses, the effects of which are shown in FIG. 4a.

FIG. 10a shows a multiphase rotary electrical machine according to the invention, comprising a magnetic device for determination of angular position represented in FIG. 1a.

FIG. 10b shows the details of arrangement in the multiphase rotary electrical machine shown in FIG. 10a, of three embodiments of the magnetic device for determination of angular position according to the invention, represented in FIG. 1a.

DESCRIPTION OF THE PREFERRED EMBODIMENTS OF THE INVENTION

Figure 1A:
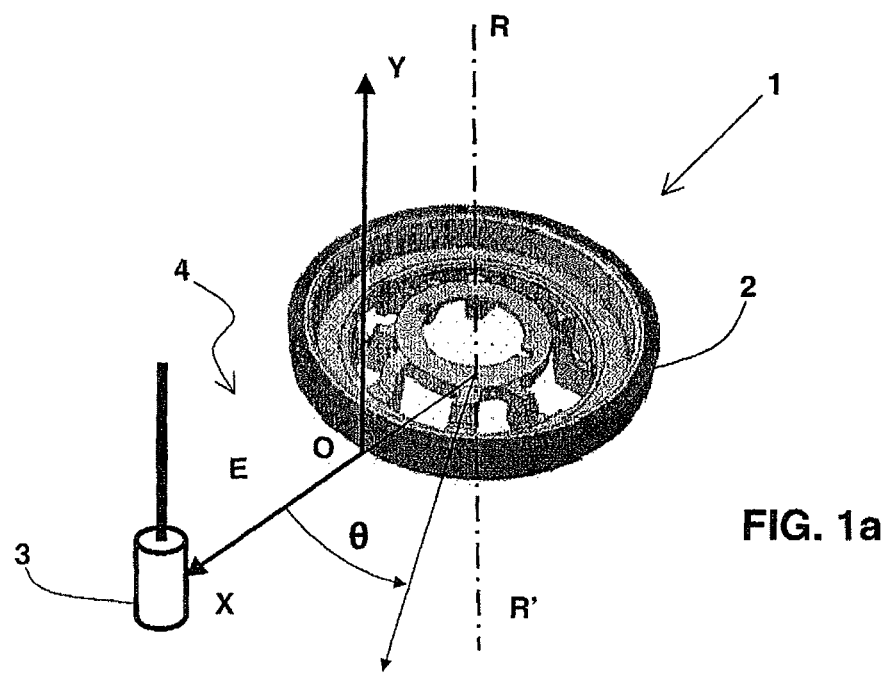
FIG. 1a is a general schematic view of the magnetic device for determination of angular position, producing a sinusoidal signal according to the invention.

FIG. 1a shows the different elements of the magnetic device 1 for determination of angular position, producing a sinusoidal signal according to the invention:
- a cylindrical multi-polar magnetic ring 2 which is mobile in rotation around an axis RR', and creates a magnetic field which is variable according to an angle of rotation θ;
- a magnetic sensor 3 which is placed in this field; and
- an air gap 4.

Figure 1B:
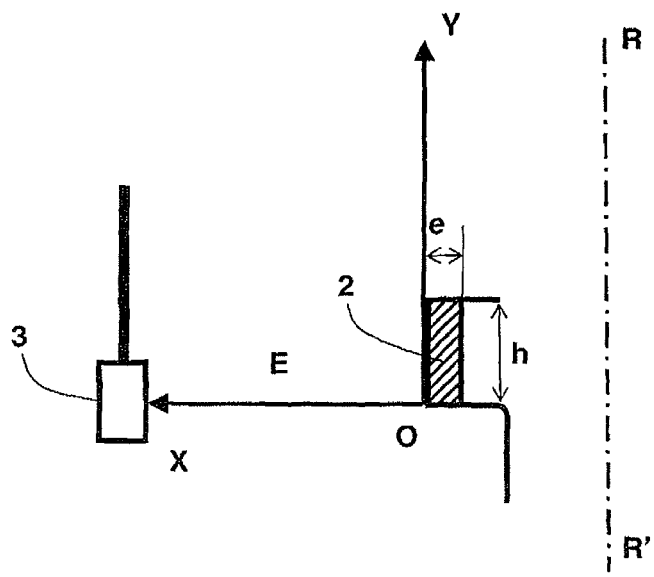

The partial radial cross-section in FIG. 1b shows clearly that the ring 2 has a rectangular cross-section with a radial thickness e and an axial height h, and that the value of the air gap 4 is the distance E between the sensor 3 and the multi-polar magnetic ring 2 on the radial plane XOY.

FIG. 1a also corresponds to the process diagram for a measurement system which makes it possible to study the effects of the displacements of the sensor 3 according to a radial direction OX, or an axial direction OY, relative to the multi-polar magnetic ring 2, on the level of magnetisation B measured by the sensor. The origin O of the displacements is selected on the lower outer edge of the multi-polar magnetic ring 2.

These effects will now be studied in detail in association with FIGS. 2a, 2b, 3, 5a, 5b and 6, and will make it possible to understand the invention well.

A first finding is that, irrespective of the material which constitutes the multi-polar magnetic ring 2, the level of magnetisation B which is measured by the sensor 3 is all the smaller, the larger the air gap 4 is.

Figure 2A:
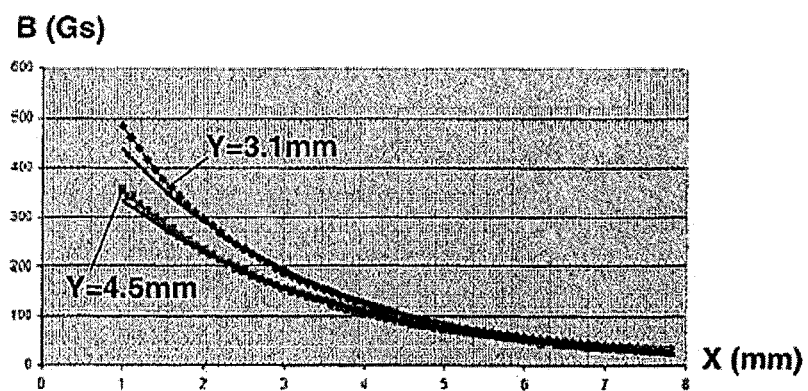
FIG. 2a shows the level of magnetisation measured by the sensor, according to the spacing of the multi-polar magnetic ring, for two axial offsettings.

Two examples of decrease according to the radial spacing (X axis) of the sensor 3 are given in FIG. 2a.

The upper curve represents the level of magnetisation B for a first axial offsetting (according to Y) of 3.1 mm relative to the lower edge O of the ring 2, whereas the lower curve represents this level of magnetisation B for a second axial offsetting of 4.5 mm.

Another finding is that the level of magnetisation decreases according to the axial spacing. For a given air gap E, the maximum level of magnetisation B is situated in the middle of the height h of the magnetic ring 2 (the ring being cylindrical), as shown clearly by the curves in FIG. 2b. These curves are obtained for a constant air gap of 1.2 mm and three different diameters of the multi-polar magnetic ring 2, of 50 mm (lower curve), 51 mm (intermediate curve), and 52 mm (upper curve).

Figure 2B:
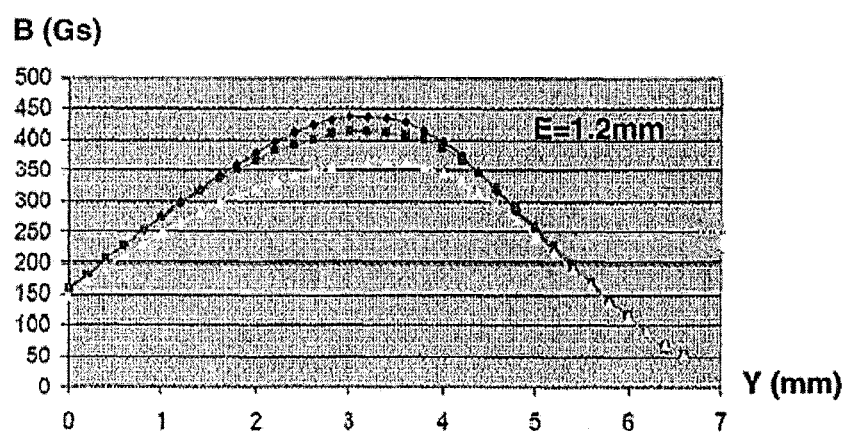
FIG. 2b shows the level of magnetisation measured by the sensor according to the axial offsetting of the sensor, for a constant air gap and for a plurality of diameters of the multi-polar magnetic ring.

The effects of the radial X and axial Y displacements represented in FIGS. 2a and 2b respectively correspond to the effects of the mechanical assembly dispersions, and it will be understood that these effects must be minimised in production.

The thermal dispersions are added to these mechanical dispersions. A multi-polar magnetic ring 2 of this type is subjected during functioning to an ambient temperature which is typically between −25° C. and 175° C. on a motor vehicle.

Figure 3:
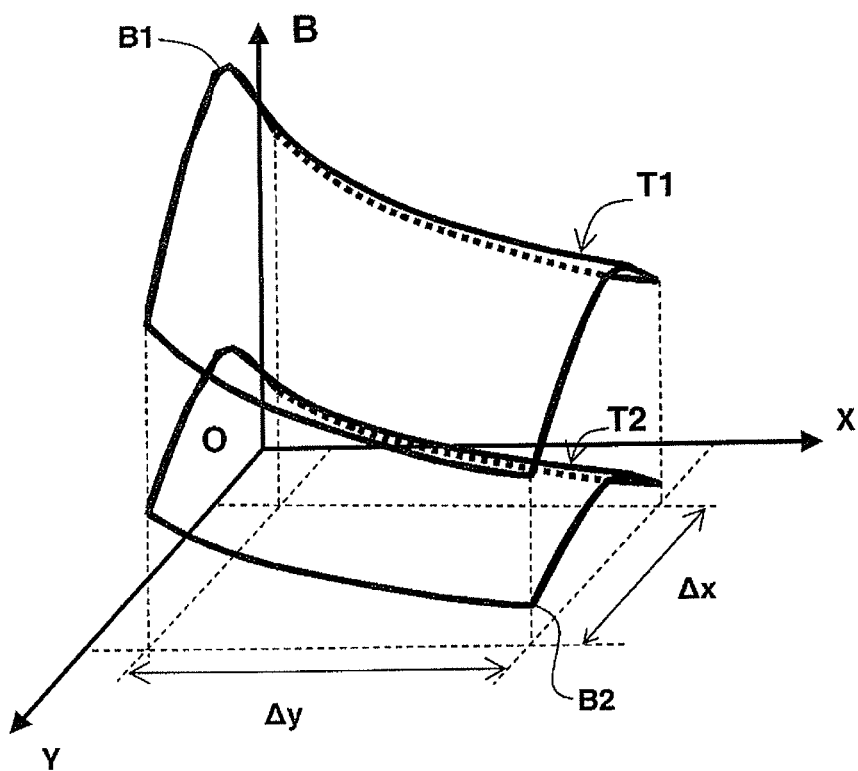
FIG. 3 shows the level of magnetisation measured by the sensor according to the air gap and the axial offsetting of the sensor, for two different ambient temperatures.

The effects of the radial X and axial Y displacements, and of the ambient temperature T1, T2 are represented schematically in FIG. 3.

The maximum magnetisation B1 is obtained when the magnetic ring 2 is axially centred and radially closest to the sensor 3, at a first temperature T1 of −25° C.

The minimum magnetisation B2 is obtained when the magnetic ring 2 is axially off-centred, and spaced furthest from the sensor 3, at a second temperature T2 of 175° C.

Information about the first case where the magnetisation B is at the maximum B1, and about the second case where the magnetisation B is at the minimum B2, makes it possible to determine the dimensional and magnetic characteristics of the device 1 for determination of angular position according to the invention, such that a peak-to-peak value of the sinusoidal signal produced is equal to 4V in the first case and 1V in the second case (for a sensor 3 supplied with 5V).

In all circumstances, the signal produced then maintains a sufficient amplitude which is appropriate for reaching the control circuit of the rotary electrical machine, without needing to limit the peak, i.e. without harmonics being generated.

The measurements made have also shown that the level of magnetisation B was all the less sensitive to the mechanical and thermal dispersions of the characteristics of the elements of the device 1, the greater the radial thickness e of the magnetic ring 2 was.

Figure 4A:
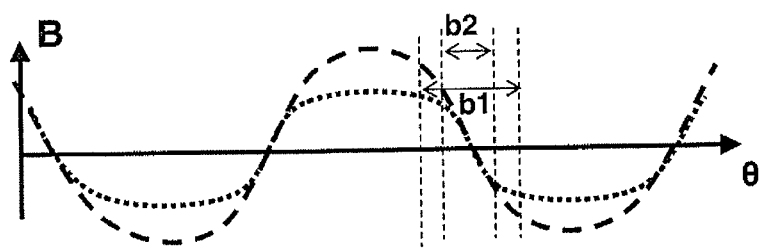
FIG. 4a shows the level of magnetisation measured by the sensor according to the angular position, for two different radial thicknesses of the multi-polar magnetic ring.

As shown clearly in FIG. 4a, the greater the radial thickness e, the greater the edge effect b1, b2 is.

Figure 4B:
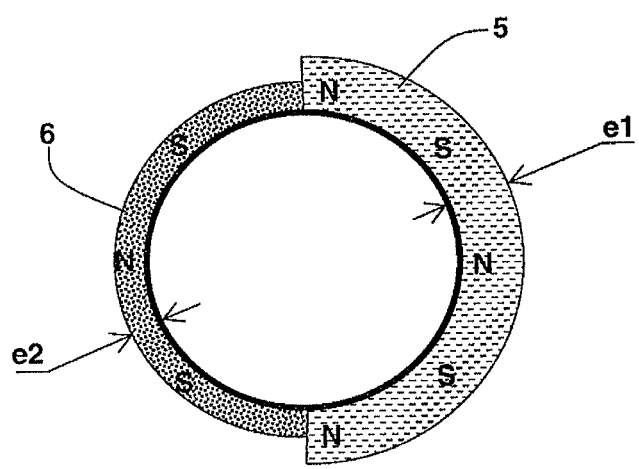

The curve in a broken line which represents the variations according to the angular position θ of the magnetic field B created by a first embodiment of a magnetic ring 5 (represented partially in FIG. 4b), with a first radial thickness e1 which is greater than a second radial thickness e2 of a second embodiment of a magnetic ring 6 (also represented partially in FIG. 4b), has an edge effect b1 which is greater than that b2 of the curve in a dotted line corresponding to the second ring 6.

When the radial thickness e is greater, the passage from a north pole N to a south pole S is more gradual, and consequently the wave form of the signal provided by the sensor 3 approximates a sine wave.

The upper limit e of the admissible thickness depends on the mechanical resistance of the magnetic material which constitutes the ring 2, to the centrifugal forces.

This upper limit also depends on the capacity of the magnetisation means to magnetise a substantial quantity of material at the moment of the magnetisation in situ of the multipolar magnetic ring on the assembly line.

On the basis of the above observations, according to the invention, the optimum radial thickness e of the magnetic ring 2 is between 1 mm and 5 mm.

Figure 5A:
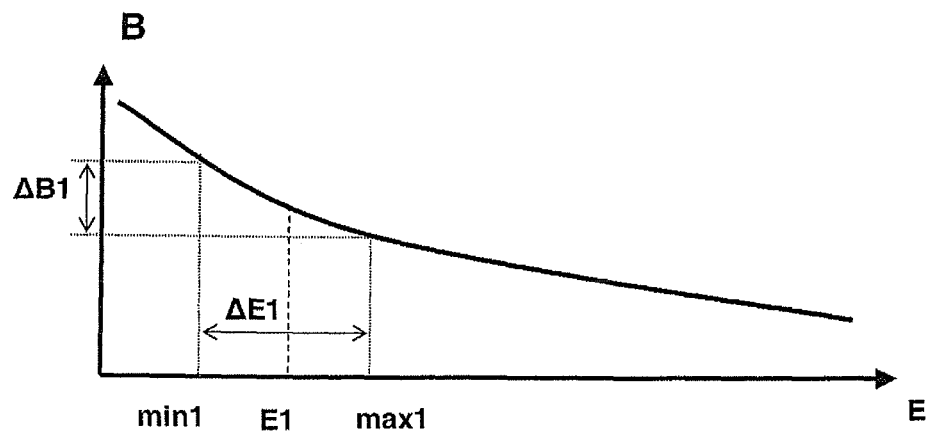
FIGS. 5a and 5b illustrate the effects on the level of magnetisation measured by the sensor of the mechanical assembly dispersion of the air gap.
Figure 5B:
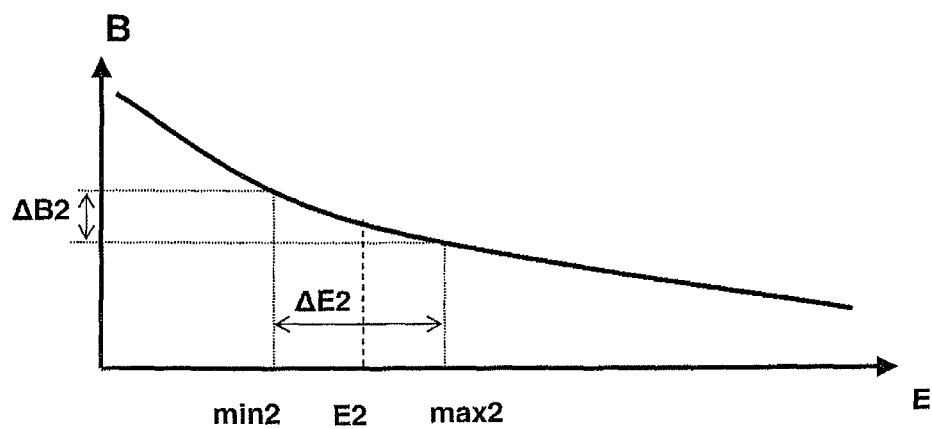

FIGS. 5a and 5b also show that the value E of the air gap 4 can be selected in an optimum manner so as to make the peak value of the sinusoidal signal produced by the magnetic device 1 for determination of angular position insensitive to the mechanical assembly dispersion of the air gap 4.

FIG. 5a shows a variation ΔB1 of the level of magnetisation B measured by the sensor 3, when the value E of the air gap 4 varies by ΔE1 around a first nominal value E1.

FIG. 5b shows that variation ΔB2 of the level of magnetisation is lower when the value E of the air gap 4 varies by the same value ΔE2=ΔE1 around a second nominal value E2 which is greater than the first value E1.

Consequently, the selection of a low limit of the air gap makes it possible to limit the variations of the level of induction B, if the air gap 4 has a maximum dimension max1, max2, or a minimum dimension min1, min2.

In addition, this low limit of the air gap prevents the risk of mechanical interference in the case of assembly at the limit dimensions min1, min2.

Since the level of magnetisation B picked up by the sensor must not become too low, there is a high limit for the air gap, because of the decrease in the level of magnetisation B when the air gap E increases.

According to the invention, the low limit of the air gap E is equal to 1 mm, and the high limit of the air gap is equal to 4 mm.

It has previously been stated that, according to the invention, the radial thickness e of the magnetic ring 2 and the air gap E were selected respectively in an optimum manner from two ranges of values.

These two ranges are advantageously combined in a single criterion which relates to a first ratio e/E of the radial thickness e to the air gap E.

This first ratio e/H is contained between 0.25 (smallest possible radial thickness to high limit of the air gap) and 5 (greatest possible radial thickness to low limit of the air gap).

Figure 6:
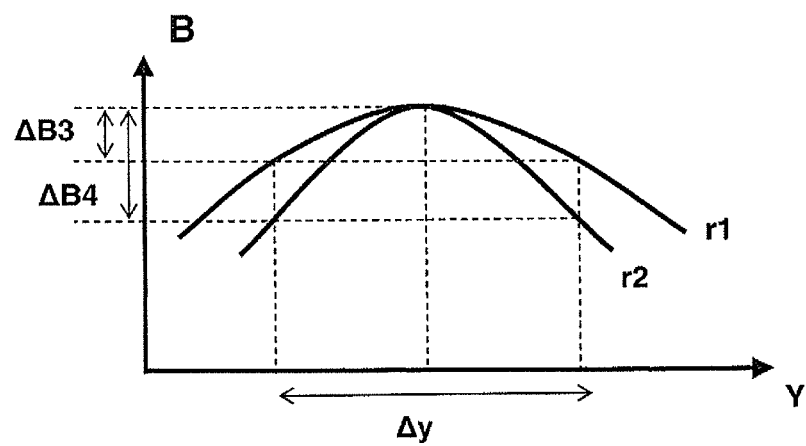
FIG. 6 illustrates the effects on the level of magnetisation measured by the sensor of the mechanical assembly dispersion of the axial positioning of the sensor, for two different ratios of axial height/radial thickness of the multi-polar magnetic ring.

As clearly shown in FIG. 6, it has also been stated that, the smaller the radial thickness e in relation to the axial height h of the magnetic ring 2, the lower the impact is of the axial dispersion Δy of the position of the sensor 3 on the level of magnetisation B, as a result of the lesser variation of the field at the edge of the magnetic ring 2.

The upper curve in FIG. 6 corresponds to a first value r1 of a second ratio h/e which is greater than a second value r2 of the second ratio h/e, for which the lower curve has been drawn. The same variation Δy of the position of the sensor 3 in the axial direction OY leads to a variation of the induction ΔB3 which is lower than ΔB4.

According to the invention, this second ratio h/e is between 1.5 and 8.

The radial thickness e of the magnetic ring 2 must not be too small, as previously explained, so that the emitter assembly (target)/receiver (sensor) remains resistant to disturbances.

In addition, as will now be explained in association with FIGS. 7a, 7b, 8a, 8b and 9, the first ratio of the radial thickness e of the magnetic ring 2 to the air gap E has a determining influence on the wave form of the signal produced by the sensor 3.

Figure 7A:
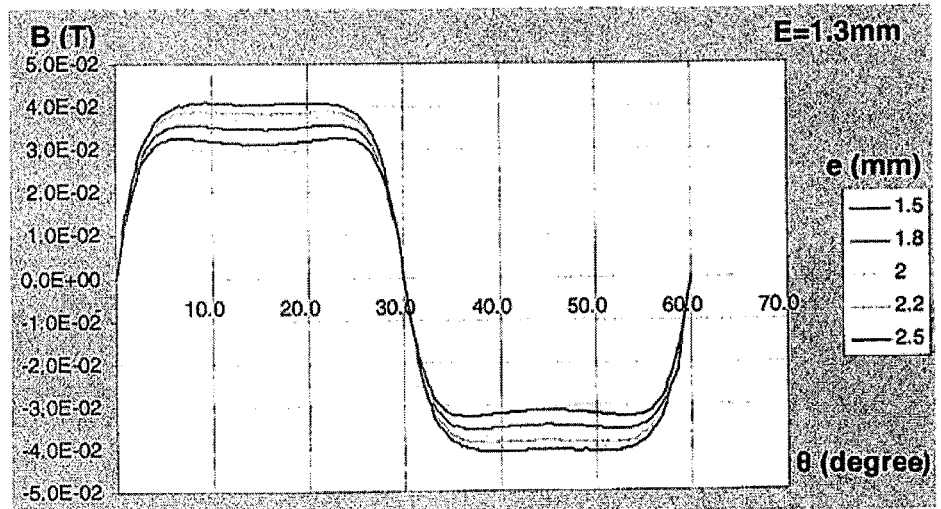
FIGS. 7a and 7b represent graphically the variations of the level of magnetisation measured by the sensor, according to the angular position of the multi-polar magnetic ring, for a first and second value of the air gap, respectively, and for different radial thicknesses.

FIG. 7a shows the variations according to the angular position θ of the magnetic ring 2, of the level of magnetisation B for a constant air gap E of 1.3 mm, and five different radial thicknesses from 1.5 mm to 2.5 mm.

Figure 7B:
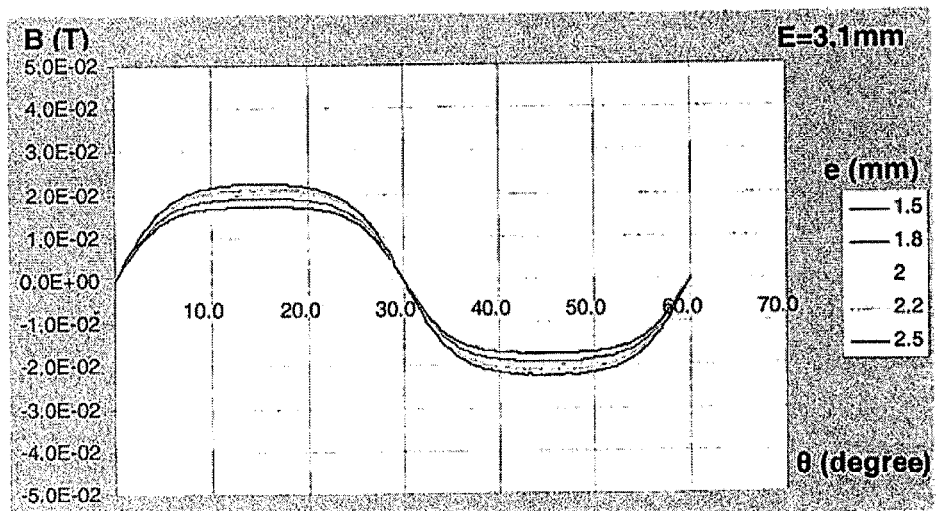

FIG. 7b shows these variations of the level of magnetisation B for a constant air gap E of 3.1 mm.

It can be noted that:

for a given air gap E, the wave form assimilates a sine wave when the radial thickness e increases;

for a given radial thickness, the wave form assimilates a sine wave when the air gap E increases.

In order to quantify the purity of the sinusoidal signal produced by the sensor 3, the attenuation of each harmonic relative to the basic level was measured.

The results of the attenuation measurements (in dB) of the harmonics of each row are given in table I for a constant air gap E of 1.3 mm, and in table II for a constant air gap E of 3.0 mm, for different values of radial thickness e of 1.3 mm to 3.0 mm.

TABLE I

Air gap: 1.3 mm

| Row: | e = 1.3 mm | e = 1.8 mm | e = 2.1 mm | e = 2.5 mm | e = 3.0 mm |
|---|---|---|---|---|---|
| 2 | −70 dB | −70 dB | −80 dB | −65 dB | −60 dB |
| 3 | −10 dB | −10 dB | −11 dB | −12 dB | −12 dB |
| 4 | −71 dB | −71 dB | −70 dB | −59 dB | −55 dB |
| 5 | −18 dB | −18 dB | −20 dB | −21 dB | −21 dB |
| 6 | −71 dB | −71 dB | −76 dB | −61 dB | −55 dB |
| 7 | −26 dB | −26 dB | −27 dB | −28 dB | −29 dB |
| 8 | −70 dB | −70 dB | −66 dB | −58 dB | −54 dB |
| 9 | −32 dB | −32 dB | −34 dB | −35 dB | −36 dB |

TABLE II

Air gap: 3.0 mm

| Row: | e = 1.3 mm | e = 1.8 mm | e = 2.1 mm | e = 2.5 mm | e = 3.0 mm |
|---|---|---|---|---|---|
| 2 | −64 dB | −68 dB | −65 dB | −58 dB | −62 dB |
| 3 | −15 dB | −16 dB | −17 dB | −17 dB | −17 dB |
| 4 | −69 dB | −65 dB | −61 dB | −63 dB | −60 dB |
| 5 | −29 dB | −30 dB | −31 dB | −31 dB | −32 dB |
| 6 | −72 dB | −60 dB | −62 dB | −72 dB | −58 dB |
| 7 | −43 dB | −44 dB | −44 dB | −46 dB | −48 dB |
| 8 | −74 dB | −68 dB | −68 dB | −69 dB | −63 dB |
| 9 | −56 dB | −53 dB | −57 dB | −64 dB | −69 dB |

These measurements confirm the findings made on the basis of the wave forms in FIGS. 7a and 7b: the harmonics (in particular on the odd rows) are all the more attenuated, the larger the radial thickness e and the greater the air gap E.

The attenuation reaches 69 dB for the harmonic in row 9 when the radial thickness e is equal to 3 mm, and when the air gap E is 3 mm, whereas the attenuation of this same harmonic is only 32 dB for a radial thickness e of 1.3 mm and an air gap E of 1.3 mm.

Figure 8A:
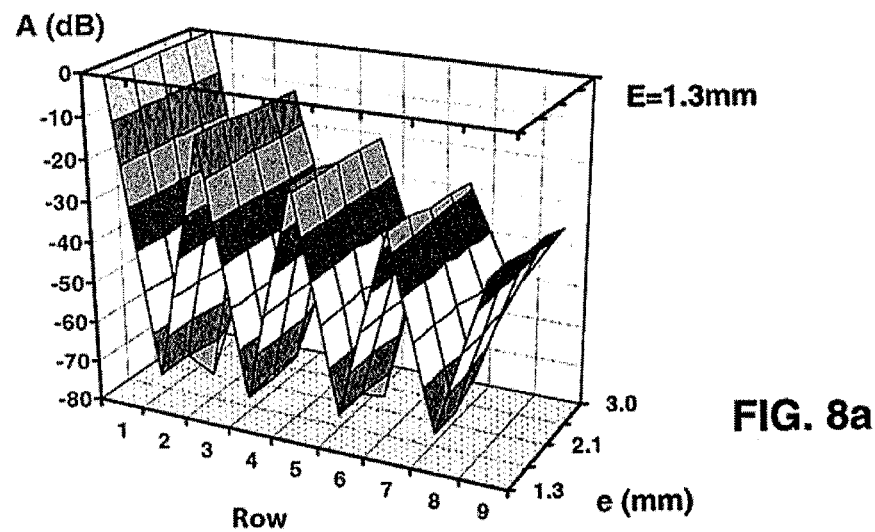
FIGS. 8a and 8b represent graphically the attenuation of the harmonics in accordance with their rows, according to the radial thickness of the multi-polar magnetic ring, for the first and second values of the air gap, respectively.
Figure 8B:
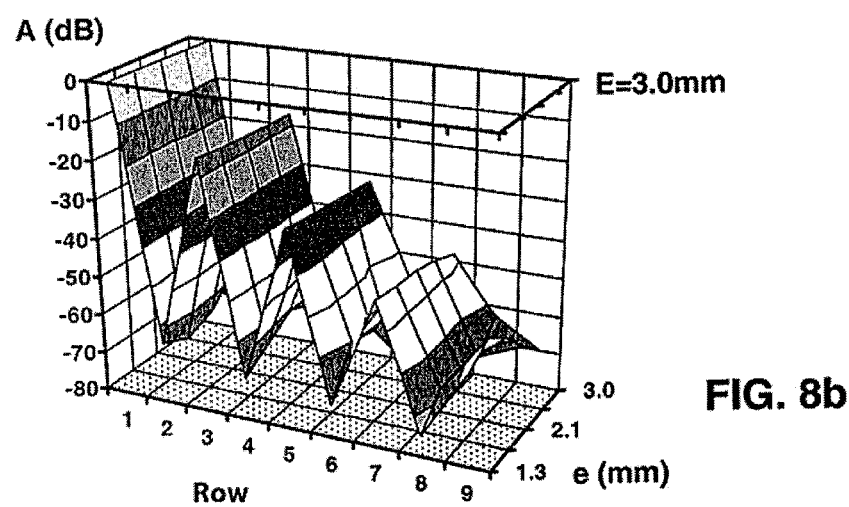

The graphic representations of the data in Tables I and II in FIGS. 8a and 8b respectively show this phenomenon clearly.

Figure 9:
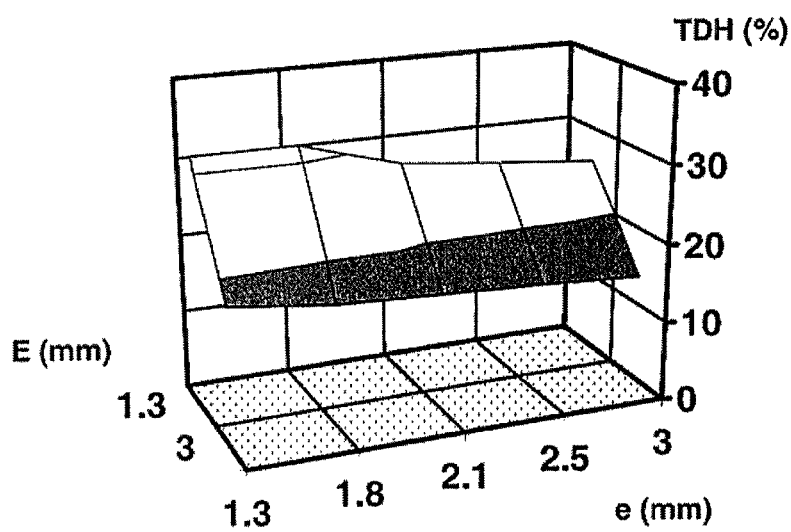
FIG. 9 represents graphically the level of harmonic distortion of the signal produced by the sensor, according to the radial thickness of the multi-polar magnetic ring and the air gap of the device according to the invention.

FIG. 9 gives the results of the measurements in an even more synthesised form by showing the variations of the levels of harmonic distortion TDH of the signal produced by the sensor 3 according to the air gap E and the radial thickness e.

In a range of values of radial thickness e contained between 1.3 mm and 3 mm, and a range of values of air gap E contained between 1.3 mm and 3 mm, i.e. a range of the first ratio e/E contained between 0.4 and 2.3, the TDH is less than 30%.

Taking into account this result, according to a preferred embodiment, the thickness e of the multi-polar magnetic ring 2 is equal to 1.5 mm, and the air gap is equal to 2 mm, which corresponds to an optimum value of the first ratio e/E of 0.75.

In all the preferred embodiments of the invention, the multi-polar magnetic ring 2 consists of a material of the ferrite or rare earth type, the level of magnetisation of which (measured axially centred) is approximately 500 Gs to 800 Gs on the surface at 25° C.

The multi-polar magnetic ring 2 comprises a plurality of pairs of angularly and uniformly spaced alternating north N and south S magnetic poles, and preferably 6 or 8 pairs of the magnetic poles.

For a given number of pairs of poles, the radius of the ring 2 influences the precision of the period of the signal produced by the sensor 3: the smaller the radius, the less this period is regular.

The radius of the multi-polar magnetic ring is limited at the top by its resistance to centrifugal forces.

These two, electrical or kinetic constraints, mean that the outer radius of the multi-polar magnetic ring 2 is between 40 mm and 80 mm.

Figure 10A:
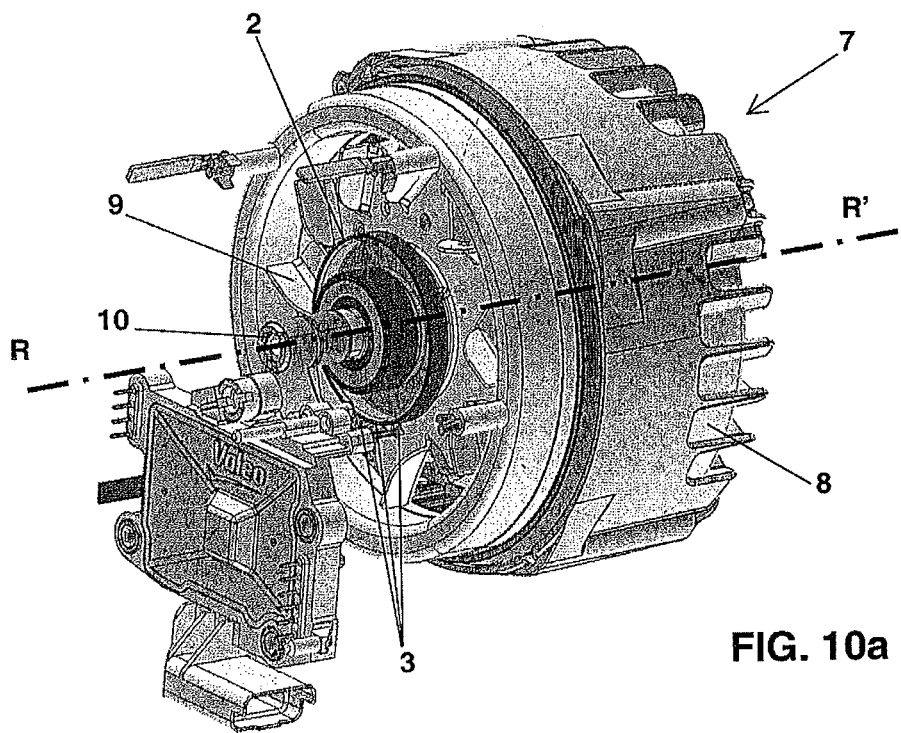

The magnetic device 1 for angular determination according to the invention is in particular advantageously implemented in multiphase rotary electrical machines of the type shown in FIG. 10a.

The alternator-starter 7 which is represented in FIG. 10a conventionally comprises a stator 8 and a rotor 9. The sensor 3 of the device 1 is integral with the stator 8, opposite the multi-polar magnetic ring 2 which is secured axially RR' at the end of the shaft 10 of the rotor 9.

Figure 10B:
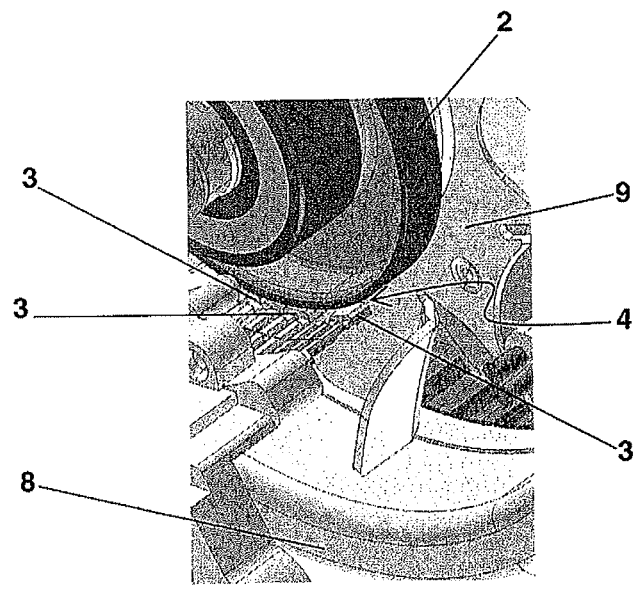

As shown clearly in FIG. 10b, the alternator-starter 7 comprises three magnetic sensors 3, which are separated from the multi-polar magnetic ring 2 by an air gap 4.

According to the dimensional criteria selected by the invention, the axial height h (dimension according to the axis RR') of the magnetic ring 2 is large relative to its radial thickness e.

FIG. 10b also shows that the radial thickness e of the magnetic ring 2 which is fitted on the rotor 9 is approximately the dimension E of the air gap 4. Consequently, the first ratio e/E has an optimum value, and the three signals which are generated by the magnetic sensors 3 have a reduced level of harmonic distortion TDH, which enables them to control with precision the electronic power circuits which carry out the switching of the phase currents of the alternator-starter 7 functioning in motor mode, or those which carry out the synchronous rectification when the alternator-starter 7 is functioning as a generator.

It will be appreciated that the invention is not limited simply to the above-described preferred embodiments.

The dimensions indicated, the magnetic induction values measured, and the voltages specified, are simply examples. The design criteria of a magnetic device for angular determination derived from the invention are provided in the form of dimensional ratios which make it possible to apply the invention in particular to rotary electrical machines of all sizes.

The invention thus incorporates all the variant embodiments possible within the limit of the subject of the following claims.

The invention claimed is:

1. A magnetic device (1) associated with a multiphase rotary electrical machine, the device (1) comprising:
   a multi-polar magnetic ring (2) mobile in rotation around an axis (R'R) and creating a variable magnetic field (B) according to an angle of rotation (0);
   a plurality of magnetic sensors (3) placed in the variable magnetic field (B), wherein said plurality of magnetic sensors (3) are coupled to the multiphase rotary electrical machine and each sensor generates a sinusoidal signal, where said signals generated by the plurality of magnetic sensors control a phase current switching function of the multiphase rotary electrical machine; and
   an air gap (4) formed by spacing each sensor by a distance E from said magnetic ring on a radial plane (XOY);
   wherein a first ratio e/E of a thickness e of said magnetic ring (2) in a direction (OX) is radial relative to the air gap E is between 0.4 and 2.3, and
   the multi-polar magnetic ring (2) includes a plurality of angularly spaced alternating magnetic poles.

2. The magnetic device (1) according to claim 1, wherein a second ratio h/e of a height h of said ring (2) in a direction (OY) which is axial relative to the said thickness e is between 1.5 and 8.

3. The magnetic device (2) according to claim 2, wherein said thickness e is between 1 mm and 5 mm.

4. The magnetic device (2) according to claim 3, wherein said air gap E is between 1 mm and 4 mm.

5. The magnetic device (2) according claim 4, wherein an outer radius of said ring (2) is between 40 mm and 80 mm.

6. A magnetic device (2) according to claim 1, wherein said ring (2) comprises elasto-ferrite.

7. The magnetic device (2) according to claim 1, wherein a level of magnetization on the surface of said ring (2) is between 500 Gs and 800 Gs at 25° C.

8. The magnetic device (2) according to claim 1, wherein said thickness e is substantially equal to 1.5 mm, and in that said air gap E is substantially equal to 2 mm.

9. The magnetic device (2) according to claim 1, wherein a peak-to-peak value of said signal is between 1V and 4V.

10. A multiphase rotary electrical machine (7) comprising a stator (8), a rotor (9) and a magnetic device (1) for determination of angular position which produces a sinusoidal signal, said magnetic device including:
    a plurality of magnetic sensors (3) integral with said stator (8); and
    a multi-polar magnetic ring (2) secured axially (RR') to said rotor (9), the multi-polar magnetic ring (2) including a plurality of angularly spaced alternating magnetic poles,
    wherein said multi-polar magnetic ring (2) is mobile in rotation around an axis (R'R), and creates a variable magnetic field (B) according to an angle of rotation (0),
    said plurality of magnetic sensors (3) are placed in this variable magnetic field (B) and each sensor generates said sinusoidal signal and said signals generated by said plurality of magnetic sensors (3) control a phase current switching function of the multiphase rotary electrical machine,
    each sensor being spaced by a distance E from said ring on a radial plane (XOY) so as to form and air gap (4), and
    a first ratio e/E of a thickness e of said ring (2) in a direction (OX) radial relative to the air gap E is between 0.4 and 2.3.

* * * * *